United States Patent [19]
Crawley et al.

[11] Patent Number: 5,881,246
[45] Date of Patent: Mar. 9, 1999

[54] SYSTEM FOR GENERATING EXPLICIT ROUTING ADVERTISEMENTS TO SPECIFY A SELECTED PATH THROUGH A CONNECTIONLESS NETWORK TO A DESTINATION BY A SPECIFIC ROUTER

[75] Inventors: Eric S. Crawley, Maynard, Mass.; Zhaohui Zhang, Durham, N.H.; William M. Salkewicz, Chelmsford, Mass.

[73] Assignee: Bay Networks, Inc., Santa Clara, Calif.

[21] Appl. No.: 661,311

[22] Filed: Jun. 12, 1996

[51] Int. Cl.⁶ ................................................. G06F 13/00
[52] U.S. Cl. .............................. 395/200.68; 395/200.72; 395/200.7; 395/200.69
[58] Field of Search ............................. 380/49; 370/236, 370/396, 392, 397; 395/200.72, 200.68, 200.7, 200.69

[56] References Cited

U.S. PATENT DOCUMENTS

| | | | |
|---|---|---|---|
| 4,873,517 | 10/1989 | Baratz et al. | 370/236 |
| 5,455,865 | 10/1995 | Perlman | 380/49 |
| 5,461,611 | 10/1995 | Drake, Jr. et al. | 370/54 |
| 5,487,064 | 1/1996 | Galand et al. | 370/392 |
| 5,517,620 | 5/1996 | Hashimoto et al. | 395/200.72 |
| 5,629,930 | 5/1997 | Beshai et al. | 370/396 |
| 5,633,866 | 5/1997 | Callon | 370/397 |
| 5,644,713 | 7/1997 | Makishima | 395/200.72 |

OTHER PUBLICATIONS

Private Network–Network Interface Specification Version 1.0 (PNNI 1.0), The ATM Forum Technical Committee, af–pnni–0055.000, Mar. 1996.

Moy, OSPF (Open Shortest Path First) Version 2, Network Working Group Request for Comments: 1583, Mar. 1994.

Moy, Multicast Extensions to OSPF, Network Working Group Request for Comments: 1584, Mar. 1994.

Coltun, The OSPF Opaque LSA Option, Internet Engineering Task Force (IETF), Internet–Draft, draft–ietf–opaque–01.txt, Feb. 1996.

Braden, et al, Resource Reservation Protocol (RSVP)–Version 1 Functional Specification, Internet Engineering Task Force (IETF), Internet–Draft, draft–ietf–rsvp–spec–12.ps, May 6, 1996.

*Primary Examiner*—Le Hien Luu
*Attorney, Agent, or Firm*—Blakely, Sokoloff, Taylor & Zafman LLP

[57] ABSTRACT

A system for providing explicit routing functions in a connectionless network. A specific router selects a path through the connectionless network to a destination. Explicit routing advertisements are generated by the specific router and contain information regarding the selected path. Routing state is installed according to information contained in the explicit routing advertisements. The explicit routing advertisements are forwarded to each next hop router. Each next hop router installs routing state, generates the explicit routing advertisement, and forwards the explicit routing advertisement to further propagate the routing information.

14 Claims, 11 Drawing Sheets

SYSTEM FOR GENERATING EXPLICIT ROUTING ADVERTISEMENTS TO SPECIFY A SELECTED PATH THROUGH A CONNECTIONLESS NETWORK TO A DESTINATION BY A SPECIFIC ROUTER

BACKGROUND OF THE INVENTION

1. Field of the Invention

The present invention relates to a system for providing explicit routing functions in a connectionless network.

2. Background

The flow of data through a connectionless network is accomplished by transmitting data from one node (or router) to the next until the destination is reached. Typical routing protocols allow each router to determine the best path for forwarding data toward its destination. Each router performs calculations to determine the next hop router based on the known network topology. In link-state routing protocols, the existence of various nodes and connections (or links) in a network are advertised to other routers in the network. Thus, each router learns the topology of the network. Knowledge of the network topology is used by each router to determine the best "next hop" router for a particular destination.

All routers in the network or area perform similar calculations to identify the best next hop router for each destination in the network. The routers use this information to forward data to the destination specified.

An example of a link-state routing protocol is the Open Shortest Path First (OSPF) routing protocol. Each router running the OSPF protocol maintains an identical database describing the network topology. Using this topology database, each router is able to generate a routing table by constructing a shortest-path tree with the router at the root of the tree. OSPF is a dynamic routing protocol; i.e., OSPF detects changes in network topology and recalculates paths based on the new topology. Typically, all routers in an autonomous network run the OSPF protocol simultaneously. OSPF allows multiple networks and routers to be grouped together. These groupings are commonly referred to as areas. Each OSPF router generates link state advertisements (LSAs) describing the local state of its links. Each LSA is flooded (or broadcast) throughout the area. The area's topology database consists of the LSAs broadcast throughout the area.

The specific topology of a particular area is not broadcast to other areas. Instead, a summary of the area is transmitted to other areas, thereby reducing the amount of link-state information transmitted through the network. When a router is connected to more than one area, it maintains a separate topology database for each connected area. A separate execution of OSPF's basic routing algorithm is performed in each area. Additionally, routing within a particular area is determined only by the topology of the particular area. Each area may use a different authentication scheme, such that some areas may use stricter authentication schemes than other areas.

MOSPF is a multicasting extension to OSPF (a unicast routing protocol). Multicasting is the distribution of datagrams from a source to multiple destinations. The multiple destinations may be members of a multicast group such that each member of a multicast group receives datagrams addressed to the group. By adding a new type of LSA, the group membership LSA, MOSPF is able to determine the location of all multicast group members in the network.

Another type of LSA which may be supported by OSPF is the Opaque LSA. The Opaque LSA provides a general mechanism to permit future extensions of the OSPF protocol.

As link state routing protocols develop, new types of link state advertisements are created and existing link state advertisement formats are expanded or extended. New types of advertisements and extensions of existing advertisements increase the amount of data which must be exchanged between routers in a network. The increased data generates additional traffic on the network and requires additional memory or storage space within each router to store the new data. Furthermore, the increased number of advertisements requires additional calculation by the routers to process the advertisements.

If the level of data generated and transmitted through the network in the form of advertisements becomes too large, overall network performance may be reduced. Network routers may utilize a significant portion of their resources generating, receiving, processing and storing advertisements.

It is therefore desirable to provide a system for reducing the amount of router resources used to generate and process network advertisements.

SUMMARY OF THE INVENTION

The present invention provides an explicit routing system for reducing the routing calculations and, thereby reducing the resources used to generate, receive, process, and store network advertisements necessary for routing calculations. Explicit routing allows a specific router (e.g., the first hop router) to calculate the entire path through a network for a particular data flow. When calculated, the path and routing instructions are provided to all other routers on the path. Therefore, the other routers do not need to calculate a path through the network because the router has provided an explicit path for the routers to follow. Additionally, only the specific router needs to receive, store, and process the advertisements needed for route calculation.

An embodiment of the present invention uses a specific router to select a path through a connectionless network. Explicit routing advertisements (ERAs) are generated by the specific router and contain information regarding the selected path through the network. The ERA is forwarded to the first hop router. Each router installs the forwarding state described in the ERA, creates new ERAs for each of its next hop routers, and forward the ERAs. This process continues until all routers on the path have installed routing state.

An embodiment of the invention provides ERAs including an encoded route tree generated by the specific router.

Another aspect of the invention includes an explicit routing advertisement having an offset value to identify certain portions of an encoded route tree.

A further aspect of the invention provides a flushing ERA for flushing the installed routing states when the path is no longer needed.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, and circuits have not been described in detail so as not to obscure the invention.

The present invention is related to a system for providing explicit routing functions in a connectionless network. As discussed above, the flow of data through a connectionless network is accomplished by transmitting data from one node (or router) to the next until the destination is reached. Link-state routing protocols advertise the existence of various nodes and links in a network. Thus, each router learns the topology of the network. As a network grows or new advertisements are broadcast through the network, significant bandwidth, memory and computational resources are required to handle the advertisements. The invention provides an explicit routing mechanism to reduce path calculations, thereby reducing the resources necessary to broadcast and process these advertisements.

Figure 1:
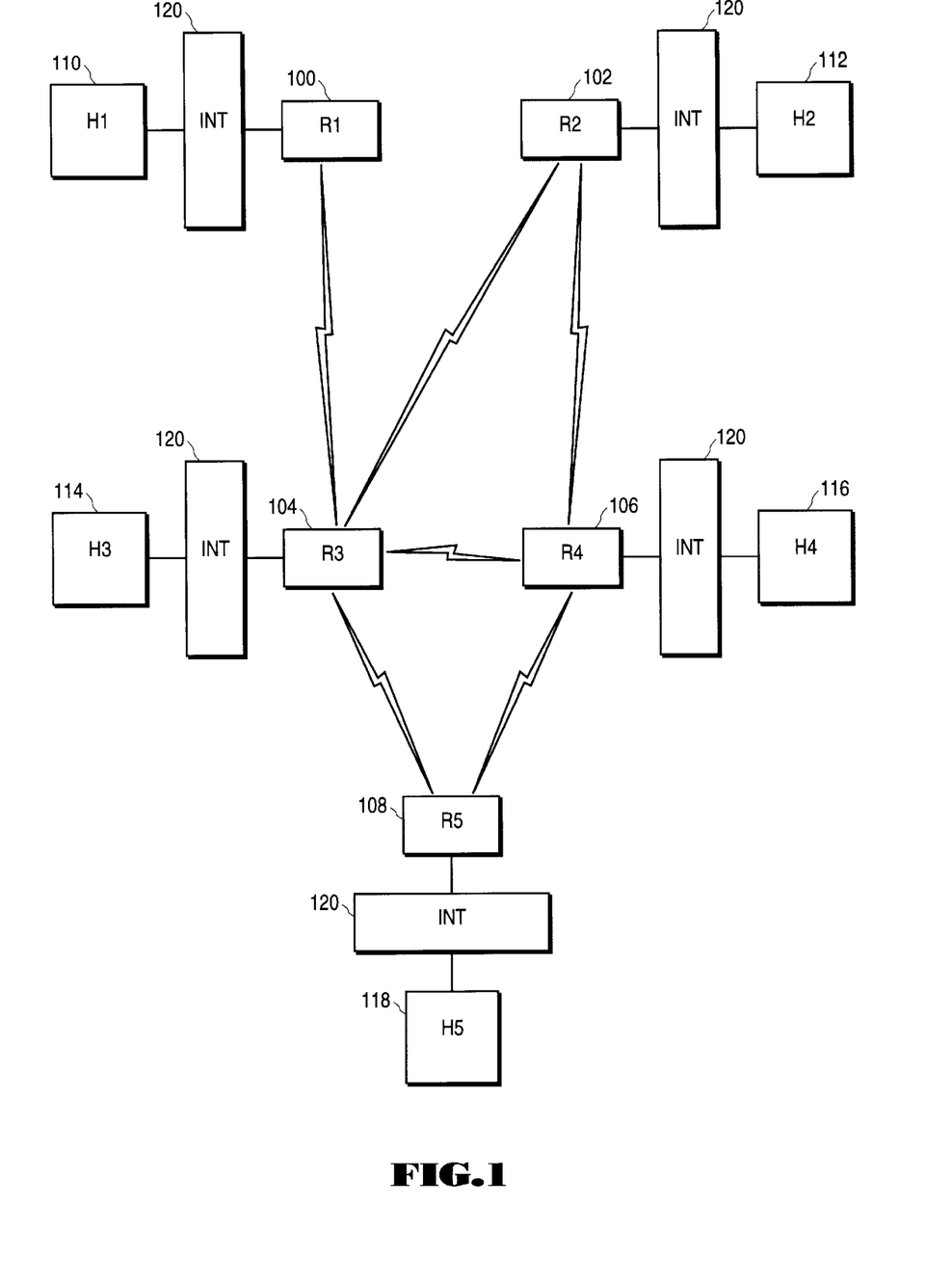
FIG. 1 illustrates an exemplary network having multiple hosts and multiple routers.

FIG. 1 illustrates an exemplary network having multiple hosts and multiple routers connected as shown. The network shown in FIG. 1 represents one possible network configuration and will be used to describe the operation of the invention. Specifically, five routers 100, 102, 104, 106, and 108 (also referred to as R1, R2, R3, R4, and R5, respectively) are coupled to one another as shown. FIG. 1 also illustrates five host devices 110, 112, 114, 116, and 118 (also referred to as H1, H2, H3, H4, and H5, respectively). Each host is coupled to a particular router using an interface 120. Interface 120 may be any type of interface circuit, including a network, capable of coupling one or more hosts to a router. Alternatively, interface 120 may be omitted, and the host (or hosts) coupled directly to the router. To simplify the illustration, only one host device is shown coupled to each router. Those skilled in the art will appreciate that multiple hosts may be coupled to a single router and a single host may be coupled to multiple routers.

Figure 2:
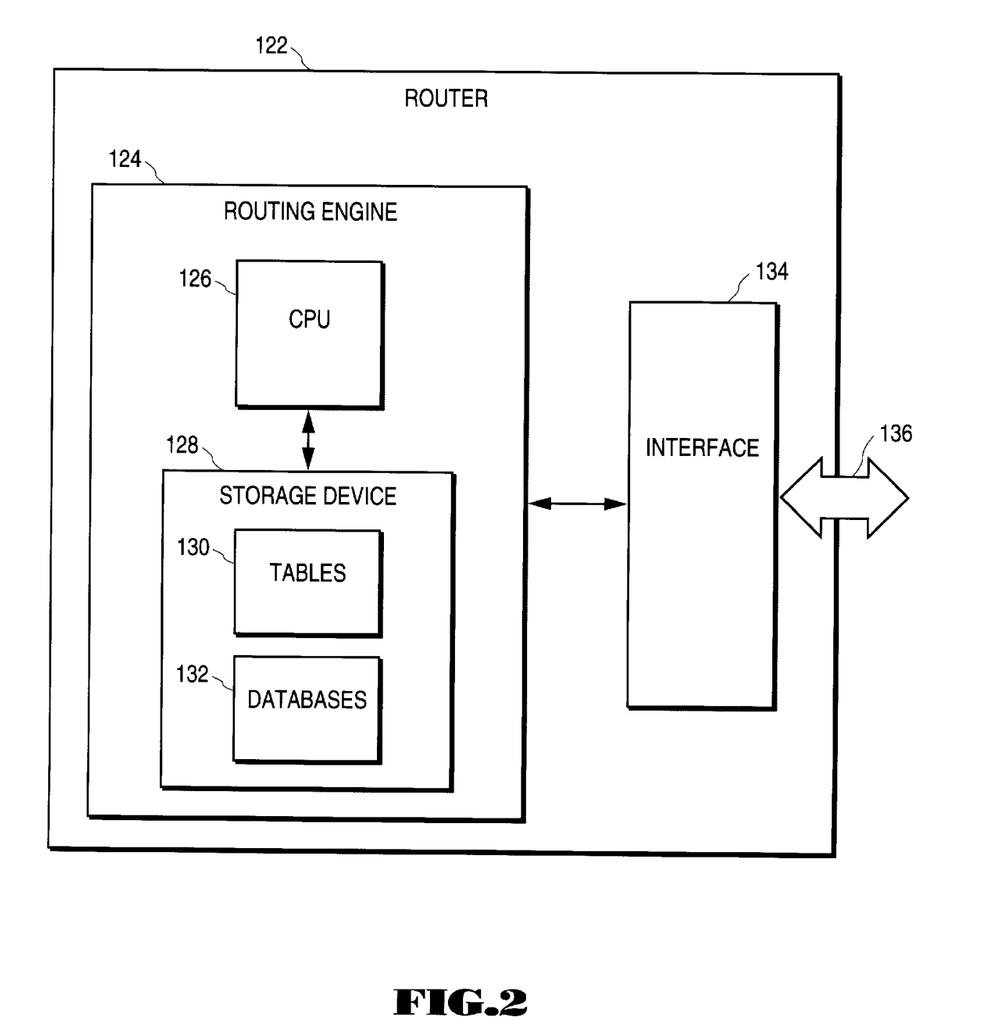
FIG. 2 is a block diagram of a typical router capable of implementing the teachings of the invention.

Referring to FIG. 2, a block diagram of a typical router 122 is illustrated. Router 122 is capable of incorporating the teachings of the present invention and includes a routing engine 124 having a CPU 126 and a storage device 128. Storage device 128 may be a memory, disk drive, or other mechanism capable of storing data. Routing engine 124 includes various routing tables 130 and databases 132 contained within storage device 128. Tables 130 and databases 132 maintain information necessary for router 122 to properly forward data. Databases 132 may include a Link State Database and a Forwarding Database. Routing engine 124 is capable of calculating paths through a network based on information contained in routing tables 130 and databases 132. An interface 134 is coupled to routing engine 124 and provides a physical connection to one or more network links 136. A single interface 134 is illustrated for clarity. However, a router may have multiple interfaces 134 coupled to multiple network links 136. Those skilled in the art will appreciate that various types of routers may be used with the invention described herein.

Explicit routing reduces the router calculations, thereby reducing resources necessary to generate and process various network advertisements. A selected router for a particular data flow calculates the entire path through the network to the destination and distributes the path information to routers along the path. Thus, instead of permitting these routers to recalculate a path toward the destination, the routers are explicitly provided with forwarding instructions from the selected router. In a path having N routers, a single router performs the necessary calculations, thereby saving N-1 calculations which would otherwise have been performed by the other routers on the path.

Figure 3:
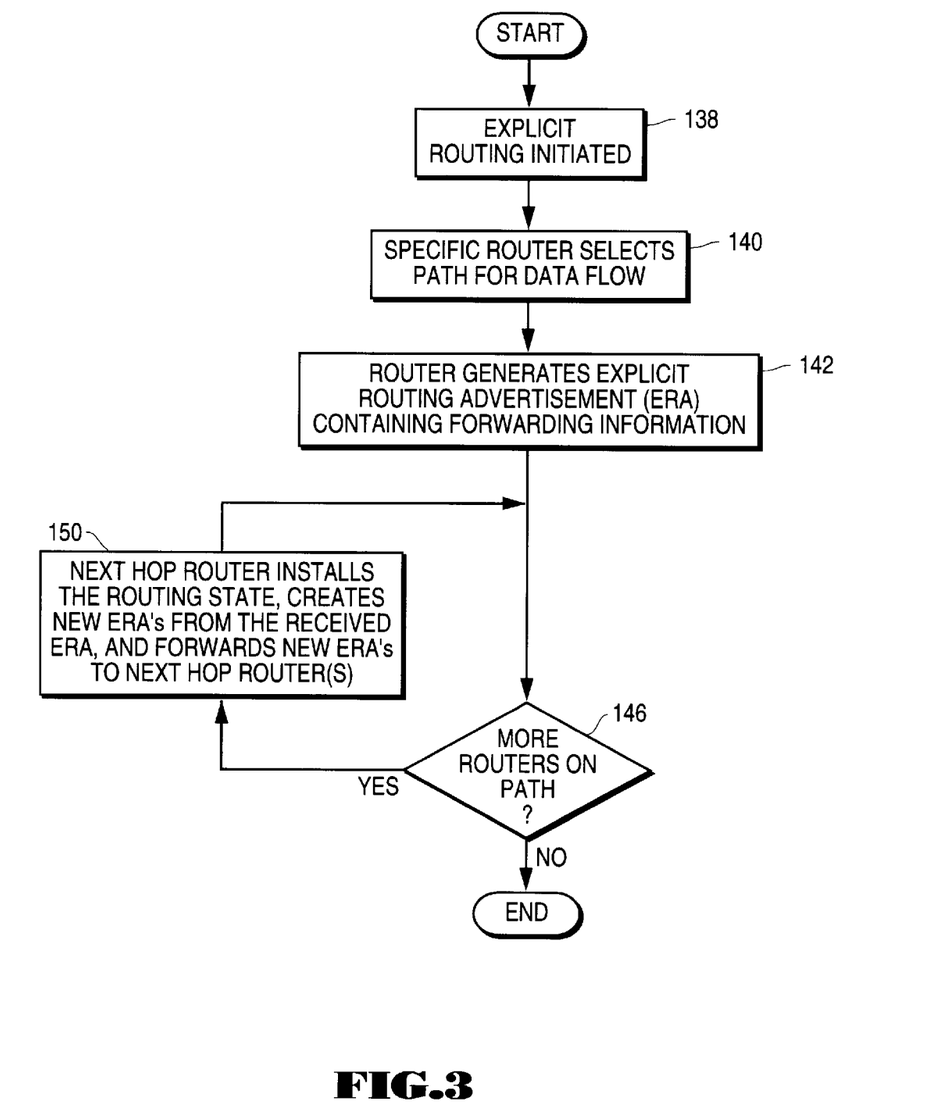
FIG. 3 is a flow diagram illustrating a procedure for performing explicit routing.

Referring to FIG. 3, a flow diagram illustrates a procedure for explicit routing. A triggering event initiates the explicit routing procedure at step 138. Triggering events may include a host transmitting data to a particular destination, a request for a particular quality of service, or a specific traffic flow exceeding a traffic threshold set for the path. Those skilled in the art will appreciate that various other events may initiate the explicit routing procedure.

At step 140 of FIG. 3, a specific router, such as the router receiving the initiating event, selects a path for the data flow (a path to the destination). The router calculates a path through the network by running a route computation algorithm such as the Dijkstra algorithm. For example, referring to FIG. 1, the explicit routing procedure may be initiated by host 110 transmitting data to host 116, thereby causing router 100 to select a path to the destination.

At step 142 of FIG. 3, the router generates an Explicit Routing Advertisement (ERA) containing forwarding information. Additional details regarding the information contained in the ERA is provided below. In the example of FIG. 1, the ERA generated by router 100 contains forwarding information for router 104 and router 106. This forwarding information instructs router 104 and router 106 regarding forwarding of the data flow. Since the forwarding information is explicitly provided in the ERA, routers 104 and 106 do not need to perform the Dijkstra calculations.

In step 146, if more routers are on the path to the destination, then the procedure continues to step 150 where the next hop router installs the routing state from the ERA, creates (or generates) new ERAs from the received ERA, and forwards the new ERAs to the next hop routers. Additional details regarding the creation of new ERAs will be described below. From step 150, the procedure returns to step 146 to check for additional routers on the path. If no additional routers are identified along the path in step 146, then the explicit route state has been installed to all routers along the path and the data is allowed to flow across the path. The explicit routing procedure illustrated in FIG. 3 is transparent to the host.

In the example of FIG. 1, router 104 receives the ERA from router 100 and installs its routing state based on information contained in the ERA. Router 104 generates a new ERA from the received ERA and forwards the ERA to the next hop router (router 106). Since router 106 is the destination router (to host 116), the selected path is established and data may be transmitted over the selected path via routers 100, 104, and 106.

A specific example of the explicit routing procedure will be described with reference to the Open Shortest Path First (OSPF) routing protocol (and multicast extensions, MOSPF). As discussed above, OSPF uses Link State Advertisements (LSAs) to broadcast information regarding various routers and links in the network. A specific type of LSA which may be supported by OSPF is the Opaque LSA. The Opaque LSA provides a general mechanism to permit extensions of the OSPF protocol.

Two different types of ERAs may be used with explicit routing, an Installation ERA and a Flushing ERA. The Installation ERA is used to distribute forwarding information to other routers in the network. The Flushing ERA is used to remove obsolete forwarding information from the routers. The Flushing ERA may be used when a route changes, thereby removing the route information contained in a previous Installation ERA.

Figure 4:
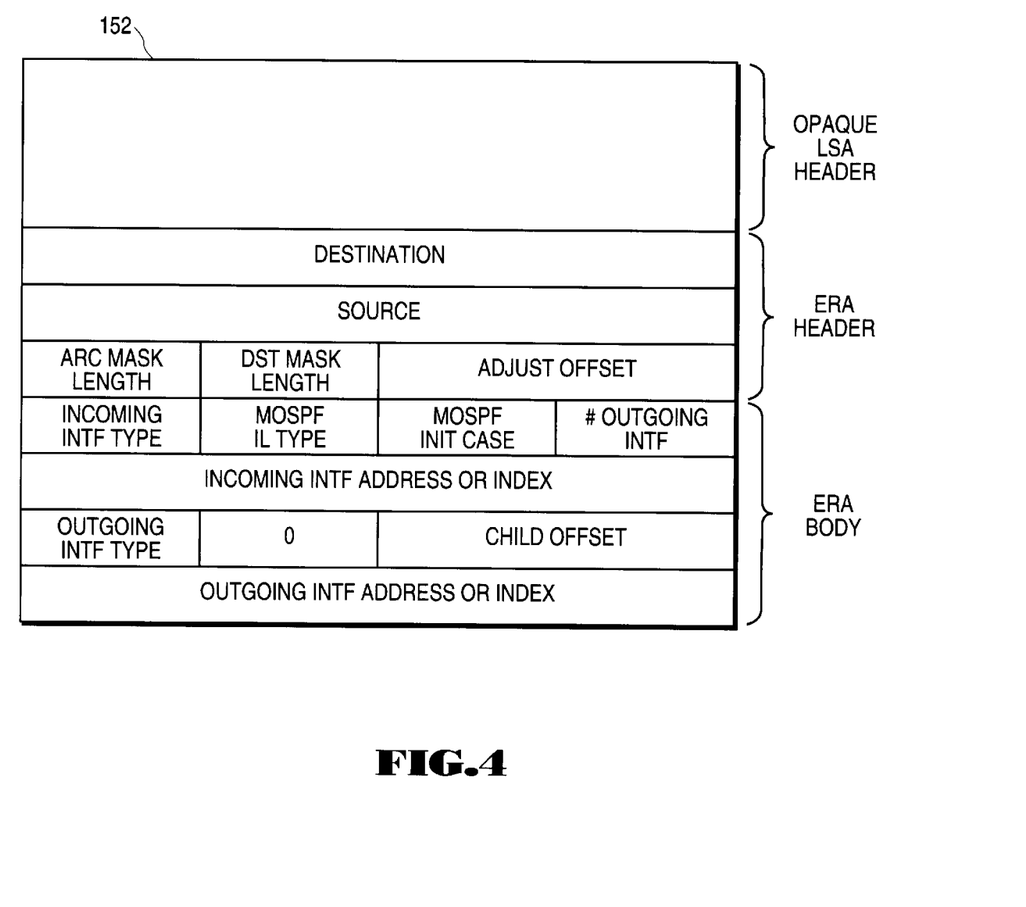
FIG. 4 illustrates an example format for an Installation Explicit Routing Advertisement.

FIG. 4 illustrates an exemplary format for an Installation ERA 152. ERA 152 is illustrated as encapsulated in an Opaque LSA and includes three different portions. The top portion of ERA 152 is a standard Opaque LSA header. The middle portion is the ERA header, and the bottom portion is the body of the ERA. The ERA header contains information that identifies a particular data flow and information regarding ERA Offset adjustment. The src mask length and dst mask length correspond to the network mask length for the source and destination, respectively. Each ERA describes route on a distribution tree. The ERA body contains information about incoming and outgoing interfaces for each router along the path. The interface types are the same as those used in OSPF Router LSAs. The adjust offset and child offset fields are used to encode the distribution tree into the ERA body, as described below. The remaining fields illustrated in FIG. 4 contain parameters and information commonly used in the OSPF and MOSPF routing protocols.

When the selected router has finished calculating a particular route, the router creates an ERA containing the calculated distribution tree that has the router as the root of the tree. The distribution tree is encoded into the ERA for use by other routers along the path.

Figure 5:
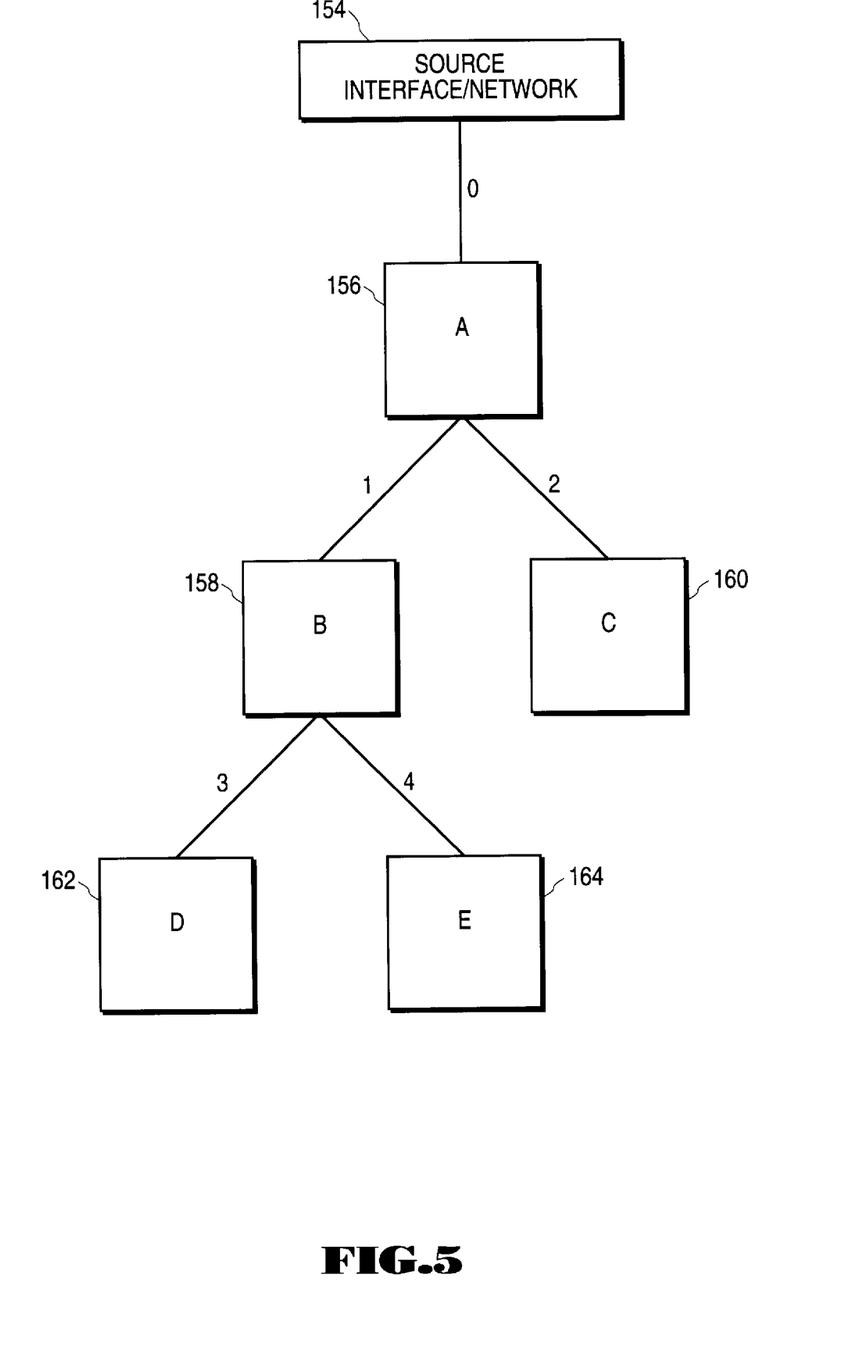
FIG. 5 illustrates an example of a route tree calculated by a specific router.

FIG. 5 illustrates an example of a multicast distribution tree calculated by a selected router. A source interface or network 154 is coupled between a host (not shown) and a router 156 (also referred to as router A). The distribution tree also includes downstream routers 158, 160, 162, and 164 (also referred to as routers B, C, D, and E, respectively). The numbers associated with each link are the interface addresses or indices. When encoding the distribution tree shown in FIG. 5 into an ERA, the ERA is constructed by traversing the tree in "preorder."Preorder traversing follows the left side of the tree until it terminates, then moves back up the tree, following each branch to the right. Thus, an ERA for the tree shown in FIG. 5 lists routers in the following order: A, B, D, E, C. In a unicast situation, the distribution tree consists of a single branch.

The example provided with respect to FIG. 5 describes a first hop router performing the path calculations and generating the initial ERA. Those skilled in the art will appreciate that any router along a path may perform the path calculations and forward the ERAs to other routers along the path. The use of a first hop router to calculate the path, as described with respect to FIG. 5, is one example of explicit routing.

Figure 6:
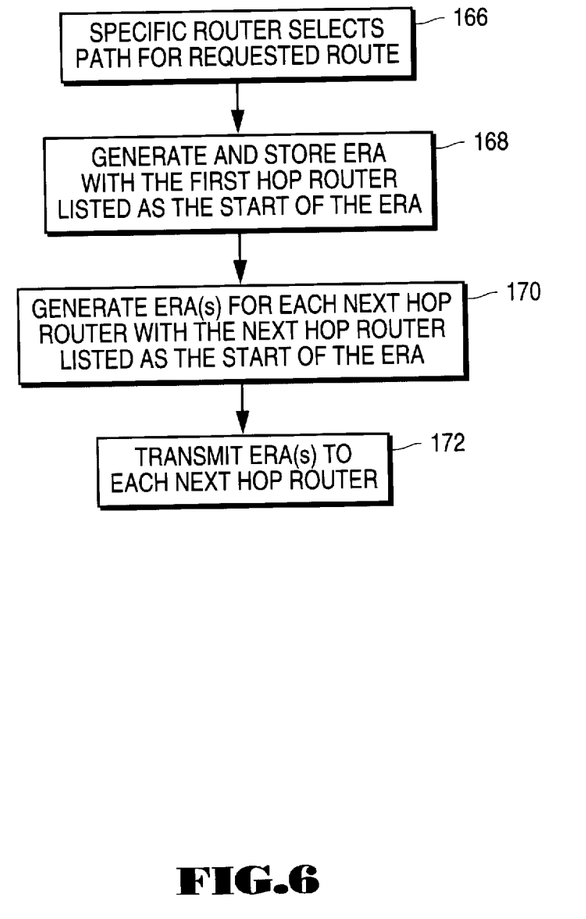
FIG. 6 is a flow diagram illustrating the procedure used to generate and transmit Explicit Routing Advertisements to the next hop routers.

Referring to FIG. 6, a flow diagram illustrates the procedure used to generate and transmit ERAs to the next hop routers. At step 166, a specific router selects a path for the data flow. Step 168 generates and stores an ERA with the first hop router listed as the beginning of the ERA. An example of this "complete" ERA is discussed below with reference to FIG. 7. At step 170, the router generates a separate ERA for each next hop router, with the next hop router listed at the beginning of the ERA. Examples of the ERAs generated at step 170 are discussed below with reference to FIGS. 8 and 9. Once generated, the ERA for each next hop router is transmitted to the appropriate next hop router at step 172.

The procedure of FIG. 6 will be described with reference to FIG. 5. Router A first selects a path through the network for the requested route. When a path has been selected, router A generates and stores an ERA with router A listed at the beginning of the ERA. The router stores this full ERA to enable flushing. Router A also generates an ERA for each next hop router (routers B and C). The ERA for router B has router B at the beginning of the ERA and the ERA for router C has router C at the beginning of the ERA.

Figure 7:
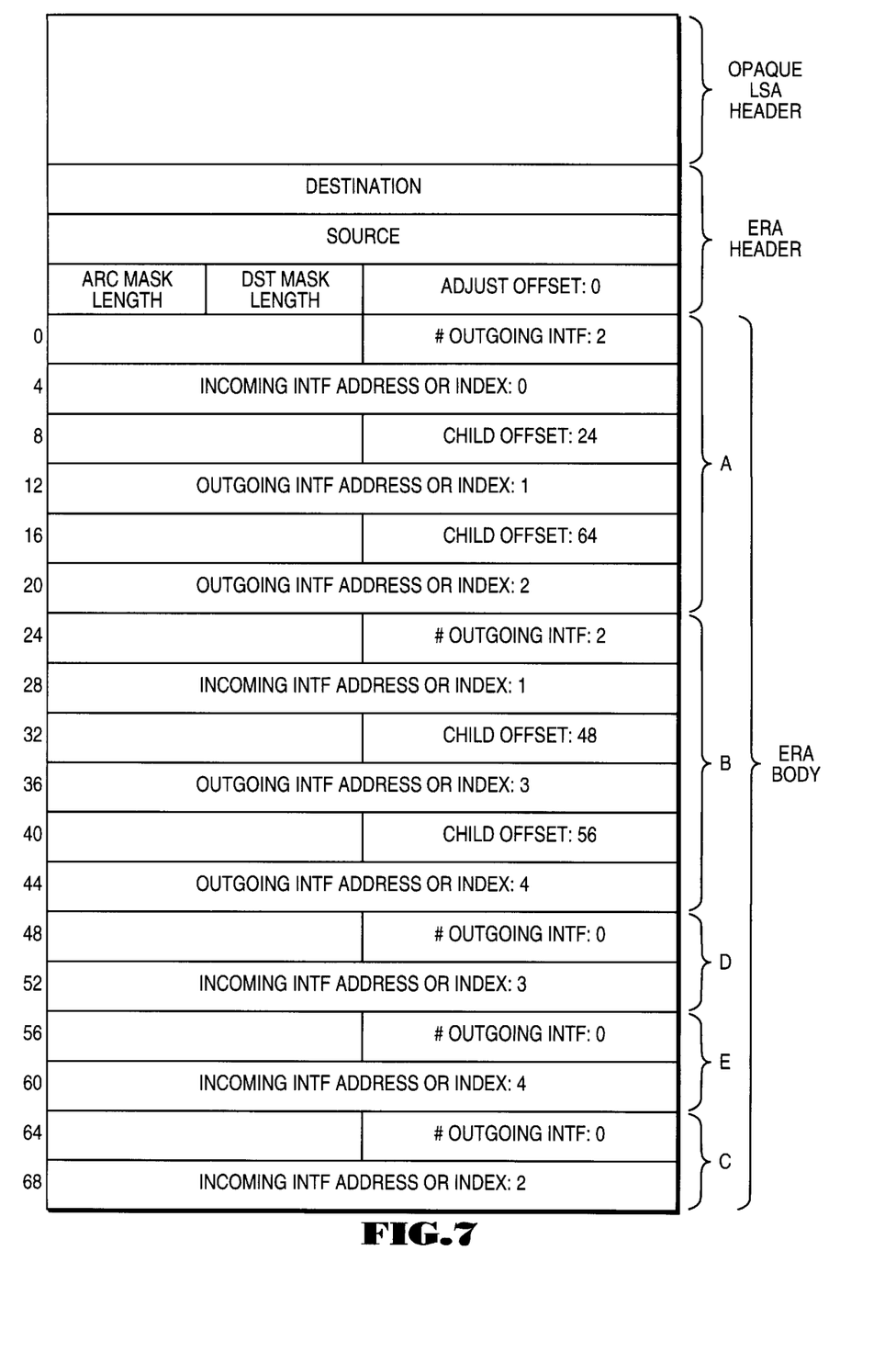
FIGS. 7–9 illustrate various examples of Explicit Routing Advertisements.

FIG. 7 illustrates an exemplary format for the "complete" ERA generated and stored by router A (FIG. 5). The offset values instruct the next router where to begin looking at tree information in the ERA. Therefore, the offsets allow each router along the path to see only its relevant (e.g., downstream) portion of the tree. By encoding the distribution tree and using offsets, routers on the path are not required to reparse the entire ERA.

Figure 10:
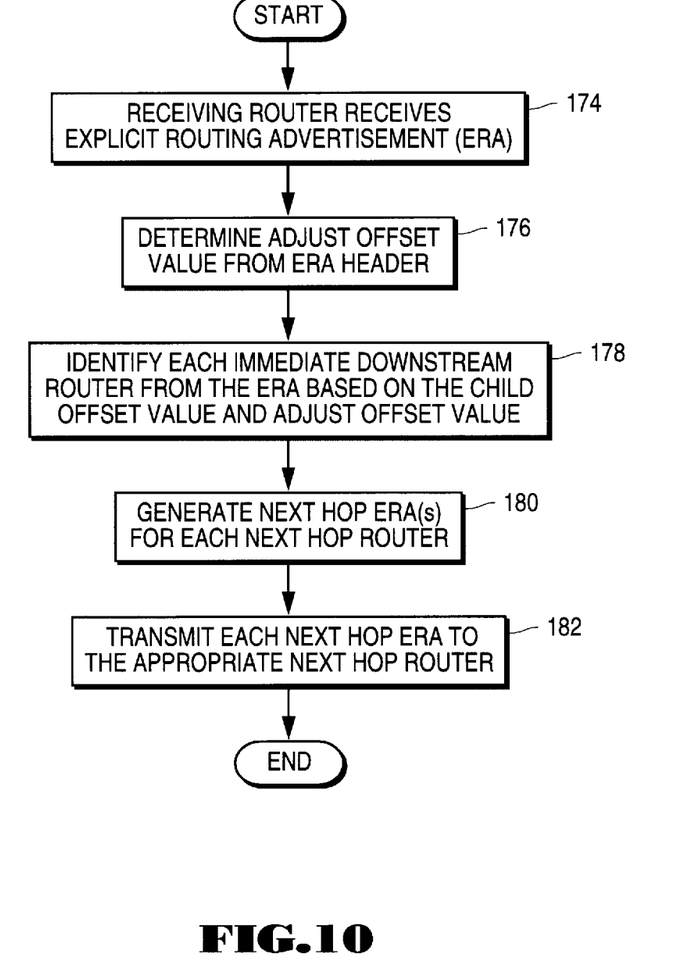
FIG. 10 illustrates a procedure for processing an Installation Explicit Routing Advertisement.

FIG. 10 illustrates a procedure for processing an Installation Explicit Routing Advertisement. At step 174, the receiving router receives the ERA. In the case of the source, or highest level, router the router itself may generate the "complete" ERA. Step 176 determines the adjust offset value from the ERA header. The adjust offset and child offset values are used to determine the location of children (next hop routers) within the body of the ERA. At step 178, each immediate downstream router is identified from the ERA body based on its child offset value and adjust offset value. Step 180 generates an ERA for each next hop router by setting the adjust offset value in the next hop ERA to the child offset value in the received ERA. The data for the next hop tree is copied into the new ERA. Step 182 transmits each next hop ERA to the appropriate next hop router.

FIG. 10 describes the "generation" of "new" ERAs for each next hop routers. As described above and illustrated in the following example, the "new" ERA is "generated" by changing an adjust offset value within the ERA header. This offset value instructs each next hop router where to locate its relevant information in the ERA body. Thus, the next hop ERAs contain the same child offset information as the received ERA, with a modification of the offset value. Therefore, the next hop routers do not recalculate the path, but rather modify the offset value to "point" to different portions of the tree encoded in the ERA.

The procedure described in FIG. 10 will be illustrated using the example tree illustrated in FIG. 5. The "complete" ERA generated by router A is shown in FIG. 7. Since this is the initial ERA, the adjust offset field in the ERA header is set to zero, indicating no offset. The receiving router (router A in this example) is listed first in the ERA body. The first field in the body indicates that router A has two outgoing interfaces. These two outgoing interfaces are identified later in the ERA as having addresses 1 and 2. The incoming interface address is 0. The first child offset field (set to 24) indicates where within the ERA body information regarding that child (next hop router) can be found. As shown in FIG.

7, byte 24 is the beginning of the information regarding router B (the child on outgoing interface 1). Similarly, the data for router A indicates the offset to router B (on interface 2) is 64.

Router B also has two outgoing interfaces (addresses 3 and 4) as indicated at bytes 36 and 44. The incoming interface for router B (address 1) is identified at byte 28. The child offsets for B's next hop routers are set to 48 (router D) and 56 (router E).

Regarding the ERA data for routers D, E and C, each router has a similar number outgoing interfaces (zero) because there are no next hop routers. Therefore, no child offset is provided because there are no children of routers D, E or C.

Figure 8:
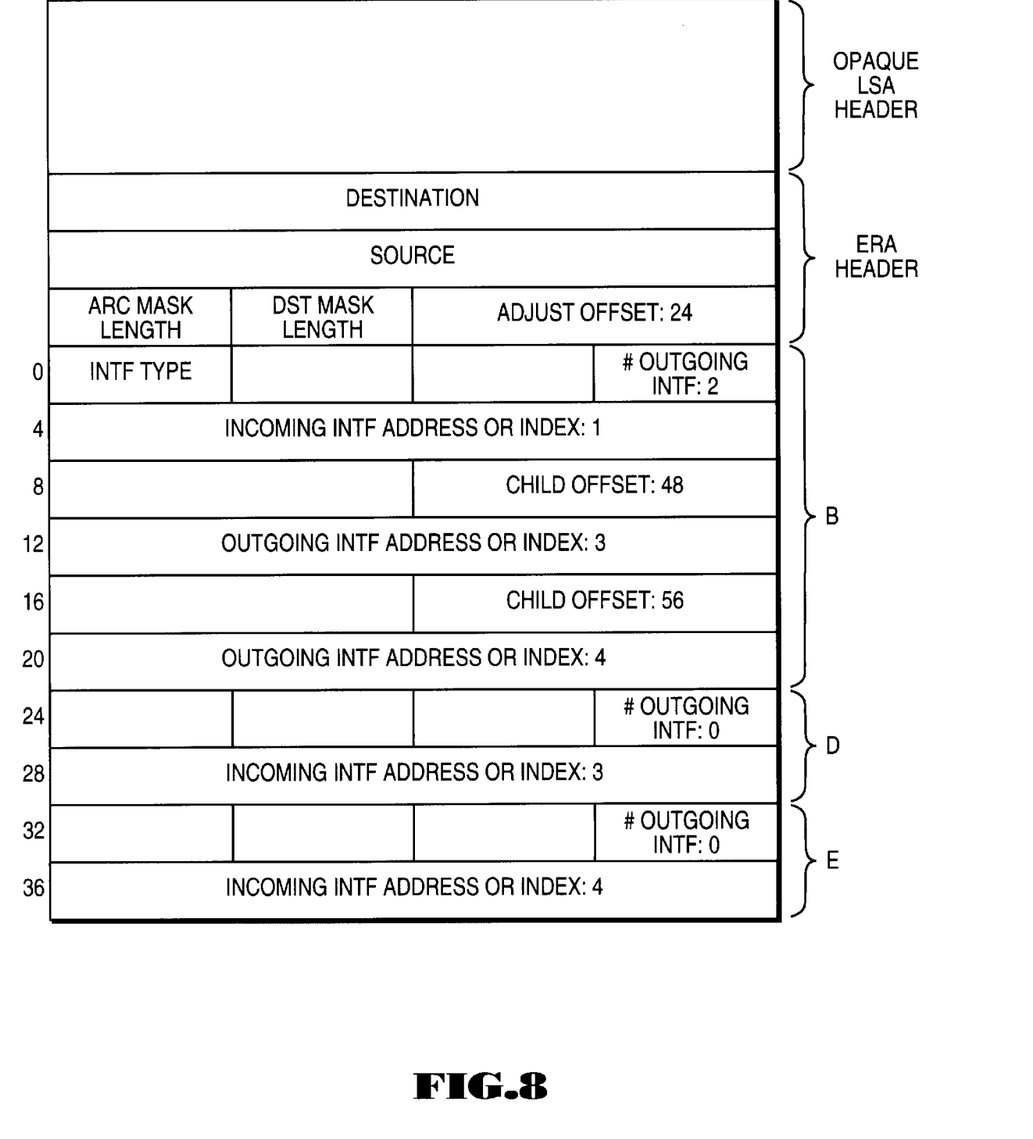

Router A generates an ERA for each next hop router (router B and router C). FIG. 8 illustrates the ERA generated and transmitted to router B. The adjust offset in the ERA header is set to the child offset for the router in the "complete" ERA. In this case, B's child offset is set to 24, meaning that 24 is subtracted from each offset value in the ERA transmitted to router B. Two child offsets are listed for router B (48 and 56). To find the data relating to B's children, the adjust offset value of 24 is subtracted from each child offset (providing actual values of 24 and 32). As shown in FIG. 8, the data for router D begins at byte 24 and the data for router E begins at byte 32.

Figure 9:
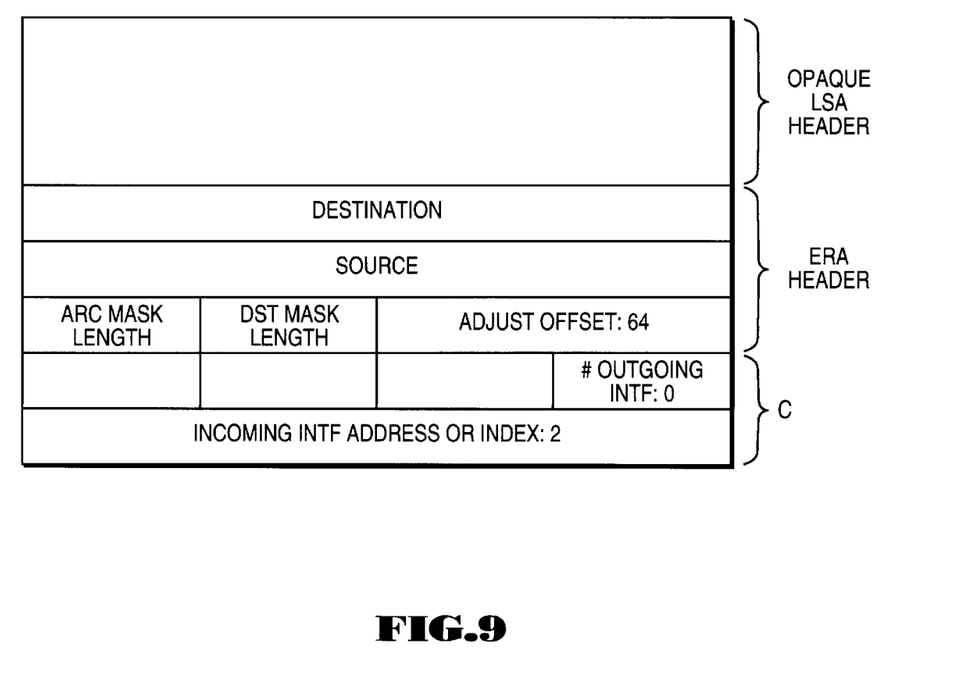

FIG. 9 illustrates the ERA generated by router A and transmitted to router C. Since router C has no children, the ERA body only contains data relating to router C.

As illustrated by the above example, each router changes the adjust offset value in the ERA headers for its next hop routers to identify the relevant portions of the distribution tree. The routers do not recalculate the path, but instead, obtain all forwarding information from the body of the ERA.

Figure 11:
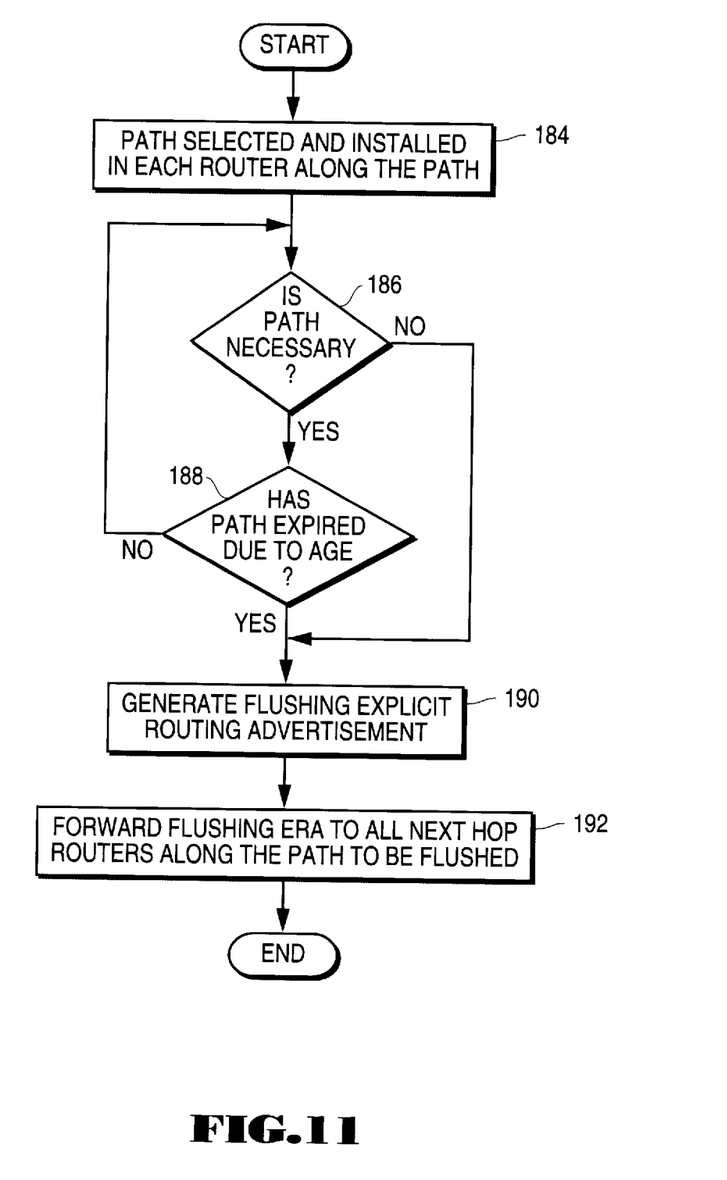
FIG. 11 illustrates a procedure for flushing installed routing states.

FIG. 11 illustrates a procedure for flushing installed routing states. At step 184, a path is selected and installed in each router along the path using the procedures described above. Step 186 determines whether the path is necessary (for example, whether an existing data flow is using the path). If the path is necessary, step 188 determines whether the path has expired due to age. If the age of a path is not updated for a particular time period, the path will expire. If the path has not expired at step 188, then the procedure returns to step 186 to determine whether the path remains necessary.

If the path is not necessary (step 186) or the path has expired (step 188), then step 190 generates a flushing explicit routing advertisement (Flushing ERA). Step 192 forwards the Flushing ERA to all next hop routers along the path to be flushed. Flushing unnecessary or expired paths provides additional resources within the routers along the path.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. A method for providing explicit routing functions in a connectionless network, said method comprising the steps of:

selecting a path through said network to a destination, said path selected by a specific router;

generating explicit routing advertisements (ERAs) containing information regarding said selected path, said ERAs generated by said specific router;

installing a routing state according to information contained in said ERAs;

forwarding said ERAs to each next hop router; and repeatedly installing routing state, generating said ERAs, and forwarding said ERAs to other routers along the path until all routers on the path have installed routing state.

2. The method of claim 1 wherein said ERAs include an encoded distribution tree generated by said specific router.

3. The method of claim 2 wherein said ERAs include an offset value to identify certain portions of said encoded distribution tree.

4. The method of claim 2 wherein said ERAs include an adjust offset value and a child offset value to identify certain portions of said encoded distribution tree.

5. The method of claim 2 wherein each next hop router changes an offset value in a received ERA to identify relevant portions of said encoded distribution tree for all routers on the path.

6. The method of claim 1 further including the step of flushing said installed routing states when said path is no longer needed.

7. The method of claim 6 wherein the step of flushing said installed routing states includes forwarding a flushing ERA along said path.

8. A method for providing an explicit route to a destination in a connectionless network, said method comprising the steps of:

a) selecting a path through said network to said destination, said path selected by a specific router;

b) generating an explicit routing advertisement (ERA) for said specific router, said ERA containing information regarding said selected path;

c) generating a next hop ERA for each next hop router and forwarding said ERA to its associated next hop router;

d) installing a routing state in said next hop router according to information contained in said next hop router ERA; and e) repeating steps c) and d) until all routers on the path have installed routing state.

9. The method of claim 8 wherein said ERAs include an encoded distribution tree generated by said specific router.

10. The method of claim 9 wherein said ERAs further include an offset value to identify certain portions of said encoded distribution tree.

11. The method of claim 9 wherein said ERAs include an adjust offset value and a child offset value to identify certain portions of said encoded distribution tree.

12. The method of claim 9 wherein each next hop router changes an offset value in a received next hop ERA to identify relevant portions of said encoded distribution tree for all routers on the path.

13. The method of claim 8 further including the step of flushing said installed routing states when said path is no longer needed.

14. The method of claim 13 wherein the step of flushing said installed routing states includes forwarding a flushing ERA along said path.

* * * * *